May 30, 1967 E. M. JOHNSON ETAL Re. 26,212
ELECTROSTATIC RECORDING HEAD
Original Filed Oct. 16, 1961
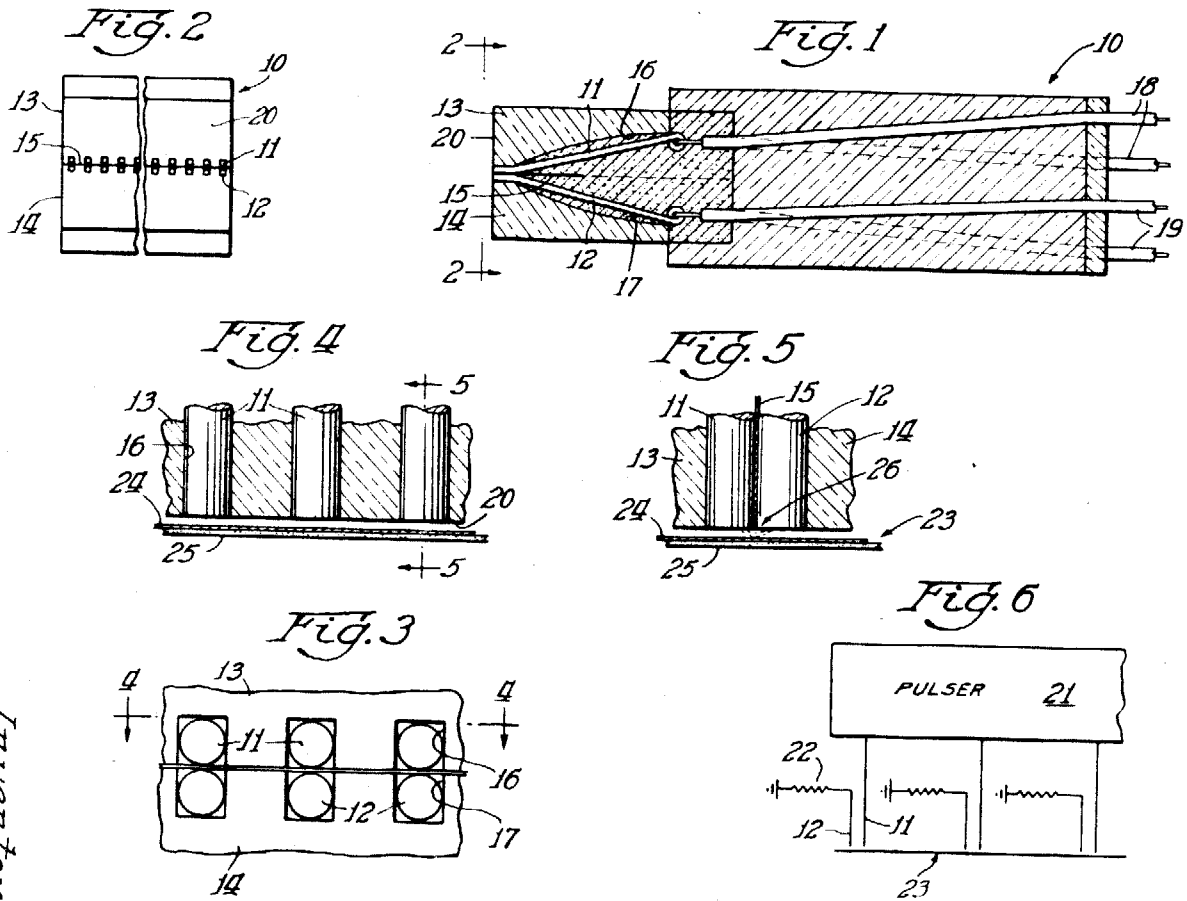
Inventors:
Herman Epstein
and Edward M. Johnson
By: James J. Jennings, Jr. Atty.

United States Patent Office

Re. 26,212
Reissued May 30, 1967

26,212

ELECTROSTATIC RECORDING HEAD

Edward M. Johnson, Glenside, and Herman Epstein, Philadelphia, Pa., assignors, by mesne assignments, to Borg-Warner Corporation, Chicago, Ill., a corporation of Illinois Original No. 3,124,804, dated Mar. 10, 1964, Ser. No. 145,373, Oct. 16, 1961. Application for reissue Mar. 7, 1966, Ser. No. 538,136
8 Claims. (Cl. 346—74)

Matter enclosed in heavy brackets [ ] appears in the original patent but forms no part of this reissue specification; matter printed in italics indicates the additions made by reissue.

This invention relates to a recording head for recording electrical signals in the form of static charges on a tape or other medium having a high surface resistivity.

The recording head of the present invention is designed primarily to record electrical signals on a moving paper tape, but may be equally useful in recording such signals on a rotating drum or a revolving disc. The paper tape on which the signals are recorded comprises a layer of carbon impregnated paper coated with an insulating layer of plastic such as polyethylene or vinyl. The carbon impregnation of the paper renders it electrically conductive and in the recording operation, this portion of the paper is normally maintained at ground potential.

The recording head comprises a plurality of free end pin electrodes disposed in a parallel array and connected to a high voltage pulser circuit. In the prior art recording heads of this general type, a single ground electrode was disposed in close proximity to the free ends of the pin electrodes but insulated therefrom. The free ends of the pin electrodes are located in close proximity normal to the insulating coating of the paper. High voltage pulses fed from the pulser to each of the pin electrodes cause an electrical discharge across the gap between the end of the pin electrode and the ground electrode. Some of the ions generated in the electrical discharge are deposited by ion migration on the polyethylene or vinyl surface. The surface resistivity of materials of this type is very high and if desired, the electrical signals may be stored in this form for prolonged periods of time.

The latent image defined by the static charges may be rendered visible by passing the tape through a dry ink or pigment powder bath. The ink powder may comprise a finely granulated mixture of resins and carbon that is electrically conductive and is attracted by the static charge so as to adhere to the tape. Any loose powder is cleaned from the tape and the ink powder attracted by the static charges is fixed thereon either by a thermal process or by pressure fixing.

In the operation of the recording head, a current limiting resistor is necessary in series in each of the pin electrode circuits. One disadvantage of the prior art type of recording head is the fact that where a common ground electrode is used for all the high voltage pin electrodes, this resistor must be located between the pulse source and the pin electrode. The high voltage pulses fed to the pin electrodes may have a magnitude of approximately minus 2,000 volts. Just prior to the instant that discharge occurs, all of this potential difference appears across the gap between the electrodes. When the electrical discharge is initiated, the voltage across the gap decreases substantially, and a major portion of the high voltage pulses appears as a potential drop across the resistor. This means that a relatively low potential exists between the pin electrode and the portion of the paper tape at ground potential. Consequently, there is a relatively low accelerating potential tending to repel the ions to the insulating coating.

It is an object of the present invention to provide an improved recording head wherein a separate pin or ground electrode is provided for each of the high voltage pin electrodes, and a current limiting resistor is connected directly in series with each of the ground electrodes. The phrase "connected in series," as used herein and in the appended claims, describes a circuit arrangement which may include elements in addition to the ground electrode and the current limiting resistor, but irrespective of the precise arrangement utilized, the current which flows in the current limiting resistor is the same as the current which passes through the ground electrode. By this provision, when the electrical discharge occurs, the negative potential developed across the resistor tends to repel negative ions generated at the gap and causes a relatively large deposit of static charge on the plastic layer of the tape.

Another disadvantage of recording heads known in the art is the fact that the materials comprising the pin electrodes tend to erode under the electrical discharge and to form oxides across the discharge gap which decrease their recording capabilities. Also, as the pins tend to erode, the location of the electrical discharge across the gap wanders so as to cause non-linear recording in a particular recording channel. The provision of a pair of closely located pins for each recording channel inhibits wandering of the discharge gap.

Still another disadvantage of the prior art devices is the fact that the insulating material, such as epoxy resin or lime glass, separating the pin electrodes from the ground electrode tends to melt or deteriorate under the high temperatures produced by the electrical discharge. Insulating materials of this type also tend to be water absorbing which increases the possibility of shorting out the high voltage pulses.

It is therefore another object of the present invention to provide an electrostatic recording head comprising pairs of pin electrodes made of tungsten or tungsten alloy having a high melting point so as to resist erosion due to electrical discharge.

It is still another object to provide a recording head of the type described wherein the high voltage pin electrodes and the ground electrodes are separated by a thin layer of insulating material having a high melting point and being non-hygroscopic such as quartz so as to resist deterioration due to high temperatures generated by electrical discharge between the pairs of electrodes, and thereby maintain the discharge at the ends of the electrodes.

The invention consists of the novel constructions, arrangements, and devices to be hereinafter described and claimed for carrying out the above-stated objects and such other objects as will appear from the following description of a preferred form of the invention, illustrated with reference to the accompanying drawing wherein:

FIGURE 1 is a longitudinal sectional view of the electrostatic recording head of the present invention;

FIGURE 2 is an end view taken on line 2—2 of FIGURE 1;

FIGURE 3 is an enlarged fragmentary view of a portion of FIGURE 2;

FIGURE 4 is a view taken on line 4—4 of FIGURE 3;

FIGURE 5 is a view taken on line 5—5 of FIGURE 4; and

FIGURE 6 is a schematic diagram of the electrical connections for the pin electrodes.

Referring to the figures, the electrostatic recording head of the present invention is designated generally by the numeral 10 and comprises a plurality of high voltage pin electrodes 11, a plurality of ground pin electrodes 12, supporting pin holders 13 and 14, and an insulating layer 15 separating the pin electrodes 11 and 12. The pin holders 13 and 14 are formed with longitudinal grooves 16 and 17, respectively, in which are contained the pin electrodes 11 and 12, respectively. Electrical conductors 18 and 19 are attached to one end of each of the pin electrodes 11 and 12, respectively.

The recording head 10 is assembled by inserting the tungsten pin electrodes 11 or 12 in the respective pin holder and clamping them into place by means of an appropriate molding block. The pin electrodes are then bonded into place by plotting the pin holders 13 and 14 with epoxy resin or other suitable potting compound. A sheet of quartz 15 having a thickness of approximately .003 in. is bonded against the parallel pin electrodes 11 or 12. The quartz sheet is then lapped down to a thickness of approximately .0015 inch. The other pin holder 13 or 14 is then bonded against the face of the quartz sheet 15 with the pin electrodes 11 and 12 lying parallel to each other at minimum distance apart. The end surface 20 of the recording head 10 is then lapped to some degree of smoothness. The end surface 20 lies in a plane defined by the free ends of the pin electrodes 11 and 12 and comprises the recording surface for the head 10.

The assembled pin holders 13 and 14 and the conductors 18 and 19 are then placed in a suitable mold and are potted with epoxy resin to form a unitary structure of suitable size.

Referring to FIGURE 6, there is illustrated a schematic diagram of the electrical connections to the pin electrodes 11 and 12. The high voltage electrodes 11 are connected directly to a pulser 21 and the ground electrodes 12 are connected in series through resistors 22 to ground. The pulser 21 provides output pulses having a magnitude of approximately minus 2000 volts to each of the electrodes 11 for the recording operation to be described hereinafter.

Referring to FIGURE 5 there is illustrated an enlarged fragmentary view of a portion of the recording head 10 disposed in close proximity to a paper tape 23. The paper tape 23 comprises a plastic or insulating layer 24 which may be polyethylene or vinyl and a conductive layer 25 which may be impregnated with carbon or other electrical conductive material. The recording head 10 is disposed above the tape 23 with the recording surface 20 parallel to the top surface of the plastic layer 24 but separated therefrom by a few thousandths of an inch. The tape 23 is moved at some predetermined speed past the recording surface 20 during the recording operation. The conductive layer 25 is normally maintained at ground potential by being in contact with metal rollers or metal guide pins connected to the chassis of the recorder.

OPERATION

In operation, negative high voltage pulses are fed to selective ones of the high voltage pin electrodes 11 according to the sequence in which the signals are to be recorded. The pin electrodes 11 and 12 and a resistor 22 form a series circuit for a recording channel between the pulser 21 and a plane of reference potential, conventionally designated as ground. When the pulse is initially applied to the circuit, and before electrical discharge occurs, all of the voltage delivered by the pulser 21 appears across the gap 26 between electrodes 11 and 12. The potential difference across the resistor 22 is zero at this instant because no current flows through it. The potential difference appearing across the gap is sufficient to cause ionization of the air molecules in the gap and an electrical discharge occurs. An electric current is then carried by ionized particles across the gap 26 for as long as the discharge continues, which is determined by the width of the pulses supplied. The voltage across the gap 26 decreases substantially and the major portion of the high voltage pulses appears as a potential or IR drop across the resistor 22. This means that the pin electrode 12 is still at a fairly high negative potential with respect to ground. Negative ions developed across the gap 26 are repelled by this potential and are deposited as a static charge on the plastic layer 24 of the tape 23. The order of time involved in this recording process is at most a few microseconds; consequently, information can be recorded at very high speeds on the moving tape 23.

The static charges deposited on the insulating layer 24 may be rendered visible by passing the tape 23 through a dry ink powder bath. The particles comprising the ink powder are attracted by the static charge and are caused to adhere to the plastic layer 24. Any loose powder is cleaned from the tape and the portion attracted by the static charge is fixed by a thermal process or pressure fixing. The resultant coded information stored on the tape can be read either by man or by an appropriate reading machine.

It should be noted that where a common bar is used as a ground connector for all of the high voltage electrodes that the current limiting resistors must be placed in series with the high voltage electrode; that is, interconnected between the pulser and the air gap. In this type of device, when the discharge occurs, the voltage across the gap decreases substantially and the large negative potential appears across the resistor, with the end of the resistor adjacent the pulser being more negative than the pin electrode adjacent the gap. Consequently, the potential difference tending to accelerate negative ions toward the tape is substantially less than in the present invention where a high negative potential is obtained at the gap. The provision of a separate ground electrode for each high voltage electrode with the current limiting resistor in series with the ground electrode results in a much higher charge density being deposited on the tape.

The provision of separate tungsten pins for each of the electrodes substantially prolongs the operating life of the recording head because the tungsten is able to withstand the high temperatures developed by the electrical discharge. In addition, the provision of two separate pin electrodes disposed close together tends to inhibit lateral drifting of the electrical discharge across the gap and thereby maintains the recorded information more truely on line in each recording channel on the tape.

The provision of a quartz separator between the pin electrodes as an insulating material also tends to prolong the life of the recording head. The quartz has a high dielectric constant and is able to withstand the high temperatures developed by the electrical discharge and in addition is non-water absorbent, and thereby resists breakdown or shorting out between the electrodes other than across the discharge gap.

There has been provided by this invention an electrostatic recording head having high reliability and long operating life. The provision of separate pins for the high voltage and ground electrodes and the maintenance of a high negative potential at the discharge gap yields recording densities heretofore unobtainable.

It is to be understood that the invention is not to be limited to the specific constructions and arrangements shown and described, but only by the description of the claims, as it will be understood to those skilled in the art that changes may be made without departing from the principles of the invention.

We claim:

1. In an electrostatic recording head, the combination of a pair of pin electrodes for each recording channel, a high voltage pulse circuit for providing [negative] high voltage pulses to one of said electrodes, and a current limiting resistor connected in series between the other of said electrodes and ground, *said resistor being the only component connected between said other electrode and ground.*

2. In an electrostatic recording head for recording a plurality of code channels on a recording medium, the combination of a pair of high melting point pin electrodes disposed parallel to each other and each having a free end adjacent the recording medium, a *single* high voltage pulse circuit for providing [negative] high voltage pulses to *only* one of said electrodes, and a current limiting resistor *being the only component* connected in series between the other of said electrodes and ground.

3. An electrostatic recording head as defined in claim 2 wherein the pin electrodes are made of tungsten.

4. In an electrostatic recording head for recording electrical signals on a recording medium, the combination of a pair of tungsten pin electrodes each having a free end adjacent the recording medium, a thin layer of high melting point non-hygroscopic insulating material separating the pin electrodes, a pulse circuit connected to supply current to one of said electrodes, and a current limiting resistor connected in series with the other of said electrodes, *said resistor being the only component connected to said other electrode.*

5. An electrostatic recording head as defined in claim 4 wherein the insulating material is quartz.

6. In a device for recording electrostatic signals on a medium having a high surface resistivity, the combination of a plurality of high voltage pin electrodes disposed in a parallel array each having a free end adjacent the recording medium, a plurality of ground electrodes also disposed in a parallel array with each having a free end adjacent the recording medium and with one such electrode disposed in close proximity with each of said high voltage electrodes, *a plurality of resistors equal in number to said plurality of ground electrodes and respectively coupled between each of said ground electrodes and ground, said resistors being the only components between said ground electrodes and ground,* and a thin layer of non-hygroscopic insulating material having a high dielectric constant and a high melting temperature separating the high voltage electrodes from said ground electrodes, the free ends of each pair of electrodes defining an electrical discharge gap where ionized particles are generated to be deposited on the recording medium.

7. In an electrostatic recording head for recording electrical signals on a moving paper tape having a plastic layer of high surface resistivity and an underlying layer which is electrically conductive and normally retained at ground potential, the combination of a pair of tungsten pin electrodes each having a free end disposed in close proximity to each other and defining an electrical discharge gap adjacent the plastic layer of the tape, the other end of one of said electrodes being connectable to a high voltage pulse generator which is adapted to supply electrical signals in the form of [negative] high voltage pulses to the electrode, a thin layer of quartz disposed between the electrodes for insulating one from the other and for preventing electrical discharge other than across the discharge gap, and a current limiting resistor connected in series between the second of said electrodes and ground, *said resistor being the only component between said second electrode and ground,* whereby when an electrical discharge occurs a high [negative] potential exists at said gap for accelerating ions produced by the discharge to the plastic layer of the tape.

*8. A recording head to be energized with electrical pulses in electrostatically recording on a recording medium coupled to a reference potential, wherein said electrical pulses have a substantially high magnitude with respect to said reference potential, comprising a pair of pin electrodes for producing electrical discharges therebetween, one extremity of each electrode being positioned adjacent a corresponding extremity of the other electrode, a high dielectric medium disposed between said pin electrodes for insulating the electrodes one from the other and preventing said electrical discharges from occurring other than between the extremities of the pin electrodes, means for applying said electrical pulses to only one of said electrodes, and a resistance being the only component coupled between the other of said electrodes and said reference potential, said electrical pulses producing electrical discharges between the extremities of said pair of electrodes, the current flow through said resistance resulting from said discharge developing a potential sufficient to accelerate ions produced as a result of said discharge toward said recording medium.*

References Cited

The following references, cited by the Examiner, are of record in the patented file of this patent or the original patent.

UNITED STATES PATENTS

| | | | |
|---|---|---|---|
| 3,004,819 | 10/1961 | Anderson | 346—74 |
| 3,012,839 | 12/1961 | Epstein et al. | 346—74 |
| 3,076,968 | 2/1963 | Schwertz | 346—74 |
| 3,195,142 | 7/1965 | Benn et al. | 346—74 |

BERNARD KONICK, *Primary Examiner.*

A. I. NEUSTADT, *Assistant Examiner.*

UNITED STATES PATENT OFFICE

CERTIFICATE OF CORRECTION

Reissue No. 26,212 May 30, 1967

Edward M. Johnson et al.

It is hereby certified that error appears in the above numbered patent requiring correction and that the said Letters Patent should read as corrected below.

In the drawings, Fig. 6, a lead terminating in a symbol representing "ground" should extend from the left side of the box designated "PULSER 21" .

Signed and sealed this 5th day of November 1968.

(SEAL)
Attest:

Edward M. Fletcher, Jr.
Attesting Officer

EDWARD J. BRENNER
Commissioner of Patents